United States Patent [19]

Glover et al.

[11] Patent Number: 4,973,188
[45] Date of Patent: Nov. 27, 1990

[54] POINTER BUSHING

[75] Inventors: Alfred H. Glover, Decatur; Joseph T. Betterton, Arab; Bruce Hepler, Huntsville, all of Ala.

[73] Assignee: Chrysler Corporation, Highland Park, Mich.

[21] Appl. No.: 377,393

[22] Filed: Jul. 10, 1989

[51] Int. Cl.$^5$ .............................................. F16B 1/00
[52] U.S. Cl. .................................... 403/305; 403/361
[58] Field of Search ............... 403/305, 301, 300, 223, 403/289, 361, 372, 291, 142, 220, 225

[56] References Cited

U.S. PATENT DOCUMENTS

| | | | |
|---|---|---|---|
| 2,190,577 | 2/1940 | Tinnerman | 403/361 X |
| 2,301,169 | 11/1942 | Engstrom | 403/361 X |
| 3,853,416 | 12/1974 | Hanan | 403/361 X |
| 4,179,771 | 12/1979 | Rankins et al. | 403/361 X |
| 4,200,405 | 4/1980 | Bauer | 403/142 |
| 4,303,815 | 12/1981 | Ishikawa | 403/372 X |

Primary Examiner—Peter M. Cuomo
Attorney, Agent, or Firm—Kenneth H. MacLean, Jr.

[57] ABSTRACT

A pointer bushing for securing an indicating element to an output shaft of an indicating instrument includes a base for spacing the pointer above the instrument face, a collar for connecting the base to the indicating element, and an S-shaped shaft gripping section for connecting the base to the output shaft. The output shaft connection includes a pair of posts which depend axially from the base, a reversely bent wing which extends from each arm, and a shaft gripping member forming the end of wing, the gripping members being in confronting relation to form a generally cylindrical, axially extending, radially expansible, socket for gripping the shaft whereby to fixedly hold the output shaft against relative rotative as well as axial movement.

1 Claim, 2 Drawing Sheets

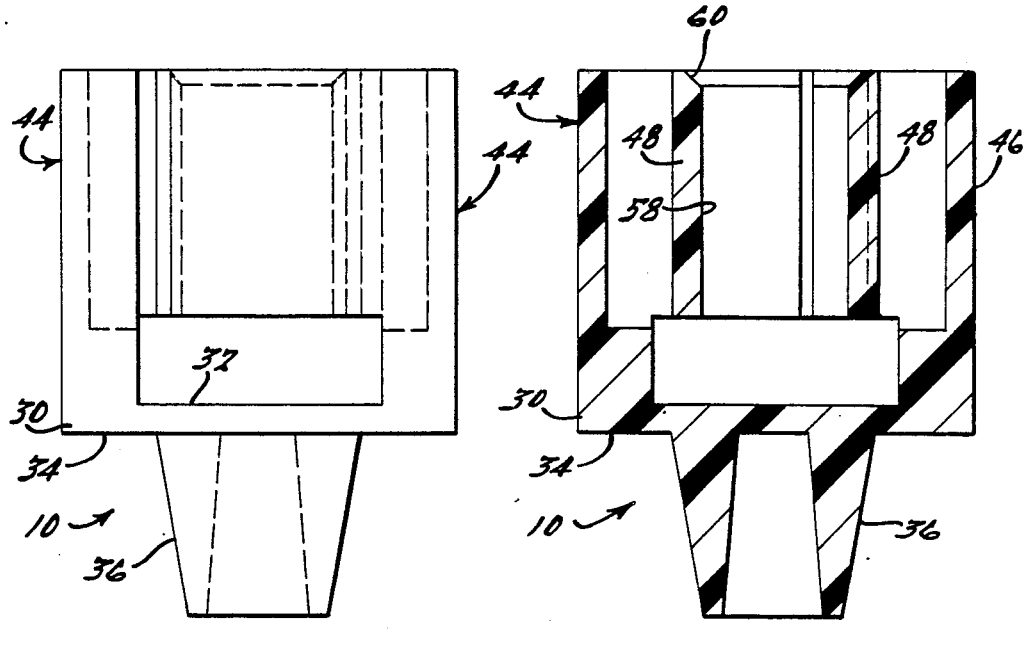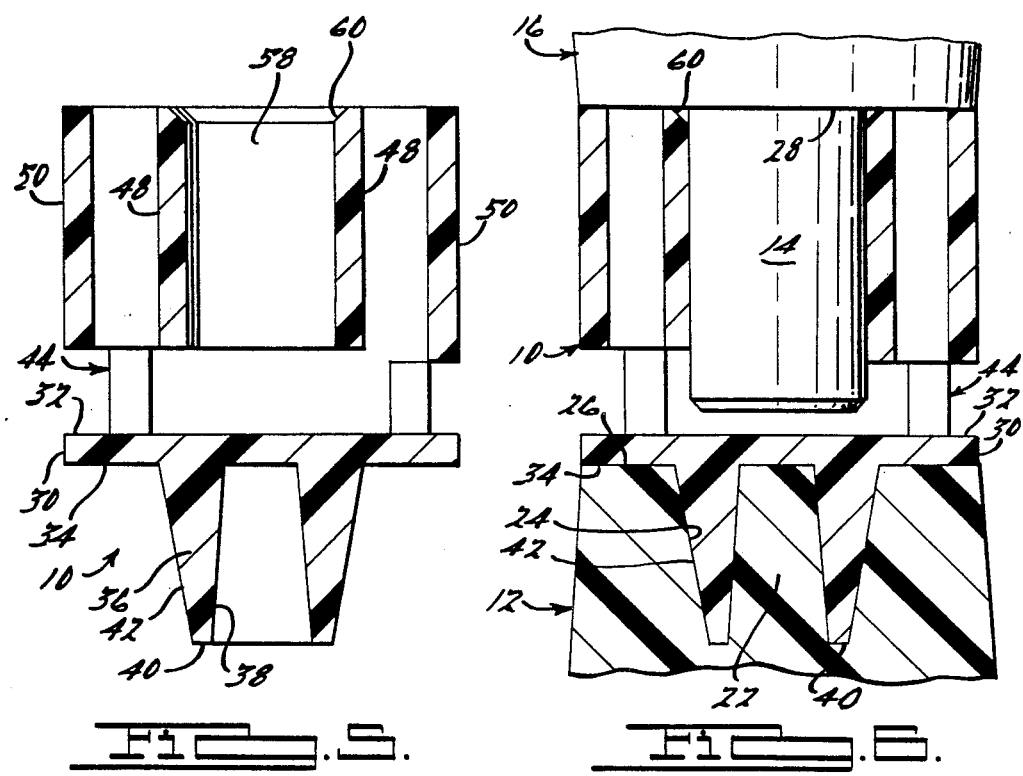

POINTER BUSHING

BACKGROUND AND SUMMARY OF THE INVENTION

This invention is directed to apparatus and an improved connection for securing an indicating element, or the like, to a cooperating shaft in fixedly held position against relative rotative as well as relative axial movement, and more particularly to a resilient bushing for attaching an instrument pointer to an indicating instrument.

Conventionally, pointers for use with instruments, such as an automobile speedometer, have been formed with openings which are designed to frictionally engage its supporting shaft. During installation, however, the amount of force required to press the pointer into place can damage both the supporting shaft and the speedometer. Friction fits can introduce torque, thereby inducing movement of the pointer from its zero position relative to the indicator. Resilient bushings, both split and non-split, have not provided a constant gripping force to obviate torques tending to disturb the position of the pointer relative to the zero position of its meter.

This invention overcomes the above problems by providing a pointer bushing which requires low insertion forces for installation. The bushing is secured at one end to the pointer and attaches to the supporting shaft by the action of a pair of cantilevered S-shaped spring elements integrally formed with the bushing, the outward end portion of the springs being biased radially inward and towards each other, and hence, into uniform gripping engagement against the shaft.

Advantageously, the pointer bushing requires less force to install, provides an axial shaft gripping engagement force that is generally constant over the shaft, and obviates rotative torques induced by resilient bushing portions that sometimes rotate the pointer from a desired zero position.

Other objects, advantages and features of the present invention will become apparent to one skilled in the art upon reading the following description and claims, taken in conjunction with the following drawings

BRIEF DESCRIPTION OF THE DRAWINGS

FIG. 3 is a side elevation view of the bushing.

FIGS. 4 and 5, respectively, are section views of the bushing taken, respectively, along lines 4—4 and 5—5 of FIG. 2.

FIG. 6 is a partial section view of the bushing when assembled onto the instrument shaft and pointer shaft.

DETAILED DESCRIPTION OF THE PREFERRED EMBODIMENT

Figure 1:
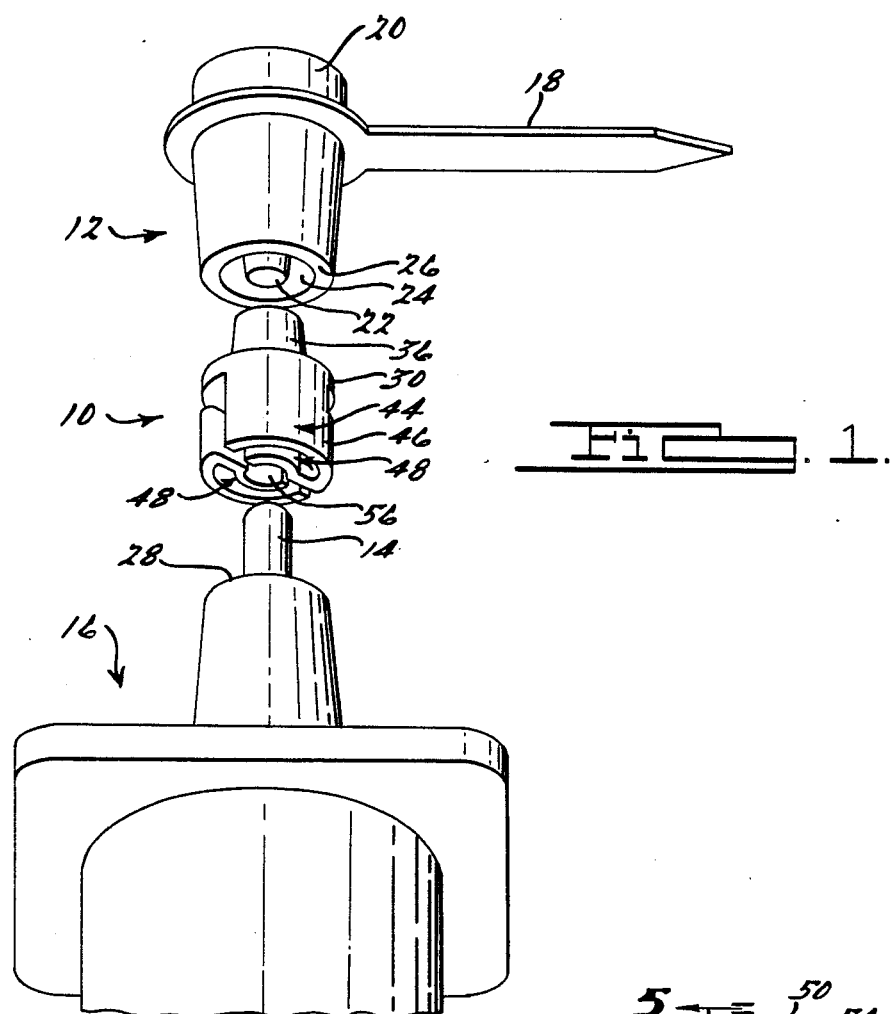
FIG. 1 is an exploded perspective view showing the opposite ends of a generally cylindrical stepped bushing, in accordance with this invention, positioned for axial assembly onto the respective shafts of an instrument and an instrument pointer.
Figure 2:
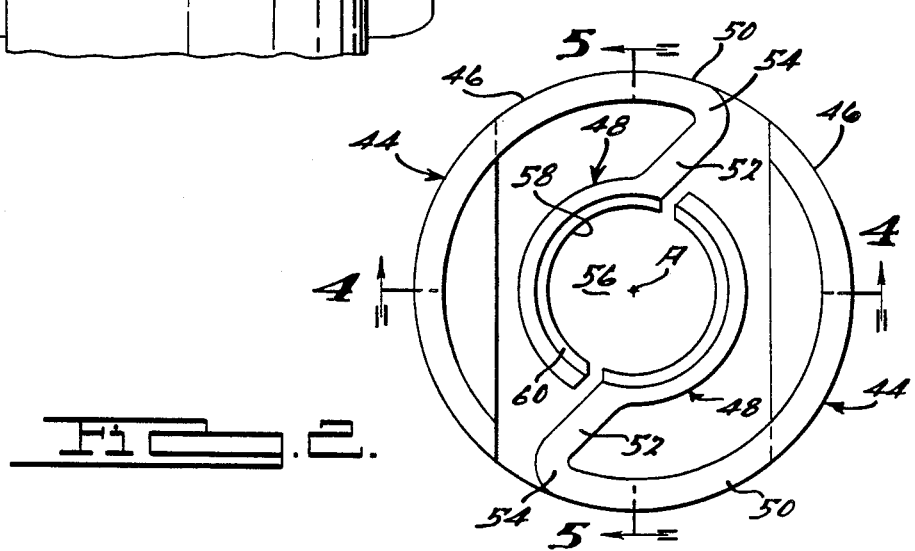
FIG. 2 shows the instrument receiving end of the bushing.

Turning now to the drawings, FIG. 1 shows a stepped bushing 10 for connectably securing an indicator member 12 such as an instrument pointer to a cylindrical output shaft 14 of an indicator instrument 16, such as the speedometer found on an automobile. Indicator member 12 includes an elongated indicator finger 18 which extends from the upper portion of a tubular body 20 and an axial mounting shaft 22 concentrically disposed within a bore 24 that extends axially inward from the end face 26 of the body. Output shaft 14 has a generally smooth periphery and extends axially upward from an instrument face 28 of indicator instrument 16 for connecting engagement with the bushing.

Bushing 10 is generally symmetrical about a center axis "A" and includes a generally cylindrical base 30 having generally flat top and bottom faces 32 and 34, a frusto-conical tubular collar 36 extending from the bottom face 34 for connection to indicator member 12, and a specifically configured S-shaped spring arrangement extending from the top face 32 for gripping the output shaft of the instrument. The base 30 is suitably dimensioned to axially space the pointer finger 18 from face 28 of indicator instrument 16 as desired The frusto-conical tubular collar 36 has an end face 40 into which extends a generally tapered bore 38 which is preferably aligned with the center axis "A" and adapted to connectingly receive the mounting shaft 22 of indicator member 12, the diameter of bore 38 and the diameter of mounting shaft 22 being dimensioned so as to provide a friction fit when the shaft is forced into the bore and the two are connected together. The outside periphery 42 of collar 38 is adapted to fit within the annular bore 24 formed in body 20 of the indicator member, preferably in a friction fit. The connection between the bushing and the pointer could be other than that shown, it only being important that the bushing be rapidly and easily mounted with a general axial insertion.

The S-shaped spring arrangement for connecting the bushing to the output shaft 14 of the instrument 16 includes a pair of flanges or posts 44 each rigidly connected at a like end to cylindrical base 30 and each extending generally axially outward from face 32 thereof, and a resilient, radially deflectable, wing 46 terminating in a C-shaped shaft gripping portion 48. Each of the wings are disposed axially outwardly from and are free to deflect relative to the top face 32 of bushing 10. Each wing 46 is reversely bent at a midportion 54 thereof to define a first and second portion 50 and 52, the first portion 50 being connected to and extending from an axially extending edge of the post from which it depends in a cantilever relationship and the second portion 52 extending generally radially inwardly towards the center axis to the shaft gripping portion 48. The first end portion 50 of the wing and the post from which it depends form a generally semi-cylindrical section with the post and respective first end portions 50 each subtending approximately 90°. The second end portion 52 forms a generally planar web that is parallel to a plane passing through the axis "A" and the opposite axial edges of the posts 44. The second end portions 52 are spaced apart and in planes parallel to one another.

The C-shaped shaft gripping portions 48 are generally coaxially centrally disposed relative to axis "A" and cooperate to define an axially extending, generally radially expansible, cylindrical socket or bore 56 of predetermined diameter, the C-shaped wall 58 of each gripping portion being adapted to grip an axial portion of the output shaft 14 when thrust into bore 56. The shaft gripping portions are supported in spaced relationship to surface 32 of base 30, and positioned in confronting or generally superposing relation, the reversely bent midportion 54 of each wing forming a point about which planar portion 52 of the wing deflects and pivots relative to the center axis "A". In one arrangement in accordance with this invention, the free ends of said wings define a plane which is substantially parallel with the planar web portions 52 and which passes through the center axis "A".

The top end face 60 of shaft gripping portions 48 have a tapered portion 60 to form a guide surface or funnel to assist in inward axial insertion of the output shaft 14. Axial insertion of bushing 10 about output shaft 14 of the instrument 16 causes tapered guide surfaces 60 of the gripping portions 48 to engage the shaft and guide the shaft into bore 56. The planar portions 52 of the wings deflect radially outward from axis "A" and bias against the side of the shaft.

While the above description constitutes the preferred embodiment of the invention, it will be appreciated that the invention is susceptible to modification, variation, and change without departing from the proper scope or fair meaning of the accompanying claims.

What I claim is:

1. In an instrument, such as a vehicle speedometer, of the type utilizing a rotatable shaft and a pointer member supported substantially normally thereto and movable by the shaft, a bushing comprising:
    a bushing member having an integrally formed body portion with one end portion supporting the pointer member and an opposite end portion removably connected to the rotatable shaft;
    the body portion having a base portion with first and second end faces;
    connection means formed on the first end face to support the pointer member;
    shaft coupling means on the second end face to connect the bushing member and the shaft including a pair of integrally formed posts which extend away from the second end face in an axial direction of the shaft;
    the pair of posts being positioned diametrically opposite one another and spaced radially outwardly with respect to the shaft;
    each post defining an edge portion facing in one circumferential direction;
    a wing structure integrally connected to each of the edge portions of the pair of posts;
    the pair of wing structures being spaced axially outward from the second end face of the body portion;
    each wing structure having a first portion which extends from an edge portion of the post in the one circumferential direction, a second portion which extends radially inward, and a shaft gripping portion spaced radially outward from the axis of the shaft when the bushing is attached to the shaft;
    each shaft gripping portion defining a semi-cylindrical end portion adapted to contact the shaft during connection of the bushing member to the shaft;
    the semi-cylindrical end portions of each wing structure being positioned diametrically opposite one another and spaced apart outwardly from the axis of the shaft whereby the semi-cylindrical end portions are spaced apart less than the diameter of the shaft thereby defining a radially expandable and substantially cylindrical socket formed between the radially outwardly movable semi-cylindrical end portions; and
    shaft insertion guide means including tapered surfaces being formed on radially inner edges of the semi-cylindrical end portions whereby when the bushing is attached to the shaft by axial movement of the shaft into the socket, the tapered surfaces center the bushing with respect to the shaft.

* * * * *